US008279972B2

(12) United States Patent
Li et al.

(10) Patent No.: US 8,279,972 B2
(45) Date of Patent: *Oct. 2, 2012

(54) SYSTEM AND METHOD CAPABLE OF IMPLICIT FEEDBACK FOR THE DEVICES WITH AN UNEQUAL NUMBER OF TRANSMITTER AND RECEIVER CHAINS IN A WIRELESS LOCAL AREA NETWORK

(75) Inventors: Qinghua Li, Sunnyvale, CA (US); Xintian Eddie Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/940,700

(22) Filed: Nov. 5, 2010

(65) Prior Publication Data

US 2011/0053545 A1 Mar. 3, 2011

Related U.S. Application Data

(63) Continuation of application No. 11/006,849, filed on Dec. 7, 2004, now Pat. No. 7,830,980.

(51) Int. Cl.
*H04L 25/49* (2006.01)
(52) U.S. Cl. ........ 375/297; 375/260; 375/299; 375/316; 375/346; 375/347
(58) Field of Classification Search .................. 375/130, 375/135, 147, 260, 262, 267, 271, 295, 297, 375/299, 316, 322, 347, 349, 300, 343, 346
See application file for complete search history.

(56) References Cited

U.S. PATENT DOCUMENTS

| 6,144,711 | A | 11/2000 | Raleigh et al. |
| 6,774,864 | B2 | 8/2004 | Evans et al. |
| 6,862,271 | B2 | 3/2005 | Medvedev et al. |
| 7,053,838 | B2 | 5/2006 | Judd |
| 7,068,628 | B2 | 6/2006 | Li et al. |
| 7,526,018 | B2 * | 4/2009 | Seo et al. ........................ 375/219 |
| 7,565,117 | B2 | 7/2009 | Sugar et al. |
| 7,596,355 | B2 | 9/2009 | Li et al. |
| 7,656,936 | B2 * | 2/2010 | Li et al. ......................... 375/148 |

(Continued)

FOREIGN PATENT DOCUMENTS

EP 1530299 A1 5/2005

(Continued)

OTHER PUBLICATIONS

International Search Report and Written Opinion received for PCT Application No. PCT/US2005/044700, mailed on Apr. 4, 2006, 11 pages.

(Continued)

*Primary Examiner* — Hirdepal Singh
(74) *Attorney, Agent, or Firm* — Kacvinsky Daisak, PLLC

(57) ABSTRACT

An embodiment of the present invention provides a wireless station (STA) capable of implicit feedback in a wireless local area network, comprising at least one power amplifier, a plurality of antennas capable of being connected with said at least one power amplifier, and a switch capable of switching the connection between said plurality of antennas and said at least one power amplifier thereby enabling said wireless station to sound a complete channel matrix for an access point (AP) in communication with said wireless station (STA).

20 Claims, 8 Drawing Sheets

U.S. PATENT DOCUMENTS

| | | | |
|---|---|---|---|
| 2001/0000959 | A1 | 5/2001 | Campana, Jr. |
| 2003/0083016 | A1 | 5/2003 | Evans et al. |
| 2004/0048584 | A1 | 3/2004 | Vaidyanathan et al. |
| 2004/0196834 | A1* | 10/2004 | Ofek et al. ............ 370/352 |
| 2004/0214606 | A1 | 10/2004 | Wichman et al. |
| 2005/0130606 | A1* | 6/2005 | Wang et al. ............ 455/101 |
| 2005/0163236 | A1* | 7/2005 | Hammerschmidt et al. .. 375/260 |
| 2005/0276347 | A1 | 12/2005 | Mujtaba et al. |
| 2006/0035601 | A1* | 2/2006 | Seo .................... 455/78 |
| 2006/0056532 | A1 | 3/2006 | Li et al. |
| 2006/0068837 | A1* | 3/2006 | Malone ................ 455/552.1 |
| 2007/0222697 | A1 | 9/2007 | Caimi et al. |
| 2008/0095260 | A1* | 4/2008 | Vaidyanathan .......... 375/267 |
| 2009/0227214 | A1* | 9/2009 | Georgantas et al. ...... 455/86 |
| 2009/0239486 | A1* | 9/2009 | Sugar et al. ............ 455/101 |

FOREIGN PATENT DOCUMENTS

| | | |
|---|---|---|
| JP | 2008-519565 A | 5/2008 |
| KR | 10-2004-0045875 A | 6/2004 |
| TW | 00510103 | 11/2002 |
| TW | 200412048 | 11/2002 |
| WO | 03/034614 A1 | 4/2003 |
| WO | 2006/052501 A | 5/2006 |
| WO | 2006/063273 A1 | 6/2006 |

OTHER PUBLICATIONS

Barriac et al., "Space-Time Commmunication for OFDM with Implicit Channel Feedback", vol. 3, IGLOBECOM 2003, IEEE Global Telecomunications conference, San Francisco, Dec. 1-5, 2003, XP010677509, pp. 1321-1325.

Barriac et al., "Wideband Space-Time Communication: From Propagation-Based Models to Information-Theoretic Design Prescriptions", 2004 Intel Conference on Signal Processing & Communications (SPCOM); Dec. 11, 2004, XP010810181, pp. 6-10.

International Preliminary Report on Patentaibility received for PCT Application No. PCT/US2005/044700, mailed on Jun. 21, 2007, 2 pages.

Office Action Received for Korea Patent Application No. 10-2007-7014563, mailed on Aug. 10, 2009, 3 Pages of Korea Office Action and 3 Pages of English Translation.

Office Action Received for Korea Patent Application No. 10-2007-7014563, mailed on Nov. 4, 2008, 3 Pages of Korea Office Action and 2 Pages of English Translation.

Office Action Received for UK Patent Application No. 0711667.6, mailed on May 15, 2009, 1 pages.

Office Action Received for German Patent Application No. 11 2005003118.7, mailed on Aug. 24, 2010, 16 pages of German Office Action, including 8 pages of English translation.

"Antenna selection for space-time communication with covariance feedback", IEEE Communications Society, Global Telecommunications Conference, 2004, vol. 2, pp. 1234-1238.

Office Action Received for Japanese Patent Application No. 2007-544643, mailed on Jun. 7, 2010, 4 pages of Japanese Office Action, including 2 pages of English translation.

Office Action Received for Korean Patent Application No. 10-2010-7014248, mailed on Sep. 30, 2010, 7 pages of Korean Office Action, including 3 pages of English translation.

Murakami et al., "Receiving Antenna Structure Technique on Basis of Eigenvalue in MIMO Systems", IEIC Technical Report, 2003, vol. 103; No. 66, pp. 53-59.

Office Action Received for Taiwan Patent Application No. 94143122, mailed on Jun. 8, 2007, 3 Pages of Taiwan Office Action and 2 Pages of English Translation.

* cited by examiner

SYSTEM AND METHOD CAPABLE OF IMPLICIT FEEDBACK FOR THE DEVICES WITH AN UNEQUAL NUMBER OF TRANSMITTER AND RECEIVER CHAINS IN A WIRELESS LOCAL AREA NETWORK

CROSS-REFERENCE TO RELATED APPLICATIONS

This application is a continuation of U.S. application Ser. No. 11/006,849, filed on Dec. 7, 2004, entitled "System and Method Capable of Implicit Feedback for the Devices with an Unequal Number of Transmitter and Receiver Chains in a Wireless Local Area Network", which is incorporated herein by reference in its entirety.

BACKGROUND

Wireless communications has become prevalent throughout society creating the need for faster and more reliable wireless communication techniques. Although not limited in this respect, one such technique, 802.11n is designed to increase WLAN speeds to at least 100M bps for data and actual throughput rates. Unlike current ratified standards— 802.11a, 802.11b and 802.11g-802.11n focuses on throughput at the MAC (media access control) interface, rather than as a signaling bit rate in the physical layer. This means the throughput rates will more likely match the highest-possible data rates. This standard may operate in the 5 GHz range along with 802.11a, although the present invention is not limited to these frequency ranges.

One technique used in 802.11n includes calibration and implicit feedback for closed loop multiple input multiple output (MIMO), which depends on the radio calibration to establish the channel reciprocity. However, there are shortcomings to current attempts at implicit feedback.

Thus, a strong need exists for an apparatus, system and method capable of improved wireless communication techniques that overcome the aforementioned shortcomings.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
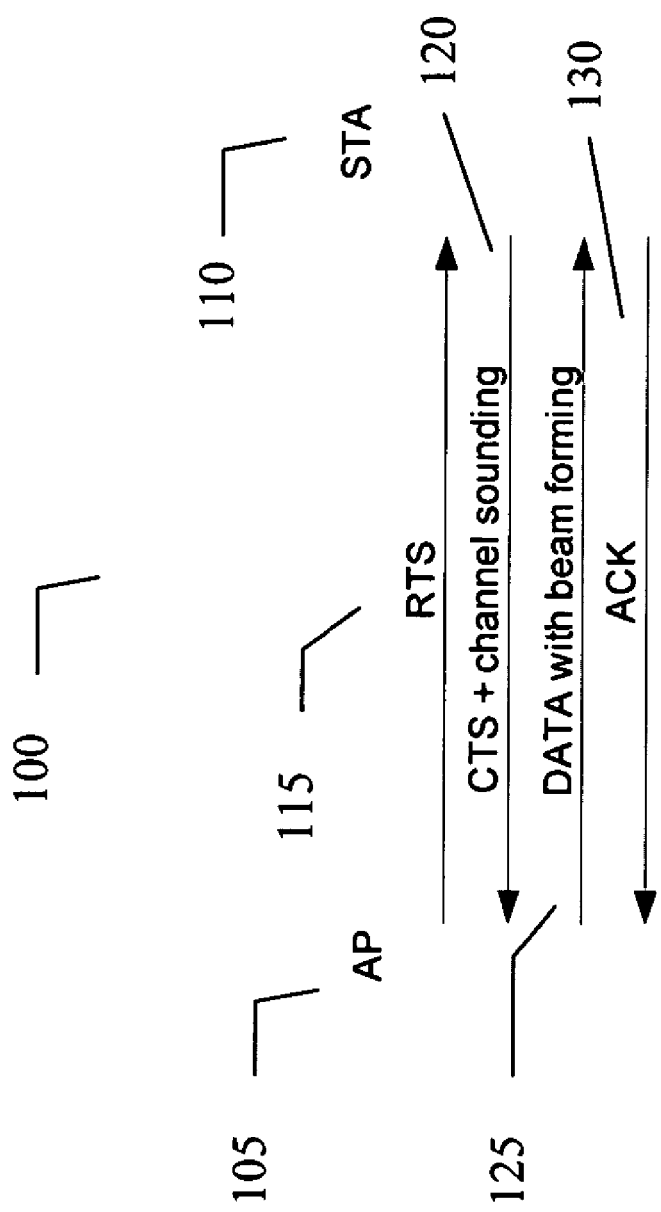
FIG. 1 illustrates a protocol for data exchange in an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause an effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like).

Multiple-input multiple-output (MIMO) antenna technology is a promising candidate for IEEE 802.11n high throughput and 802.16d standard. It is understood that these standards are just a couple of many wireless communication techniques that are intended to fall within the scope of the present invention and any standards illustrated herein are intended to merely exemplify techniques which may obtain benefits by utilizing the present invention.

The 802.11n standards group has been working on a closed loop MIMO technique which may have significant advantages over the mandatory open loop MIMO systems. An "implicit" feedback, which depends on radio calibration to establish the channel reciprocity, may be used in the 802.11n wireless communication standard and requires calibration. This method has an advantage of potential lower cost on the wireless station (STA) side.

In an embodiment of the present invention are described 2 switch schemes and the associated short and long preamble structures used for (automatic gain control) AGC setting and channel training for a 2×3 MIMO system. However, it is understood that although a 2×3 system is exemplified herein, the principles and methodologies of the present invention can be utilized in many different systems and may be extended to other MIMO system with unequal number of transmitter and receiver chains all of which are intended to be within the scope of the present invention. Since 2×3 is a very popular scheme to extend the range of MIMO spatial multiplexing, these schemes may be put in place to support implicit feedback closed-loop MIMO to further extend the range of the 2×3 system.

In an embodiment of the present invention at least 2×2 MIMO may be provided as a baseline. Further, in an embodiment of the present invention and not limited in this respect, is provided a 2×3 system as well. This notation indicates 2 transmitting chains and 3 receiving chains on the device—again, it is understood that the 2×3 scheme is but one of many schemes and is provided herein for illustrative purposes only. It may be noted that the 2×3 may have a better eigen value distribution compared to that of a 2×2 channel matrix, which makes the multiplexing mode usable over a much longer distance.

In an embodiment of the present invention, and as mentioned above not limited in this respect, there are currently two issues with such 2×3 systems and the present invention articulates schemes to mitigate them. Channel reciprocity is one such issue. The close-loop MIMO may send back the Channel State Information (CSI) to the transmitter. Based on the CSI, the transmitter may form spatial beams, which offers a 4-10 dB advantage depending on number of transmitting and receiving antennas. "Implicit" feedback takes advantage of the channel reciprocity when the radios are properly calibrated—which is to say that the downlink channel may be the transpose of the uplink channel. Therefore, the CSI does not need to be sent back "explicitly"; it can be estimated from the reverse traffic.

FIG. 1, shown generally as 100, illustrates a protocol for data exchange in an embodiment of the present invention. In an embodiment of the present invention it is assumed the AP 105 needs to send a data packet to the STA 110. The AP 105 initiates the Request To Send (RTS) 115 packet when the media is idle. The STA 110 sends back the Clear To Send (CTS) with channel sounding packet 120 to let the AP 105 obtain the uplink channel. From the reciprocity, the AP 105 also gets the downlink channel and subsequently sends the DATA with beam forming 125. The STA 110 sends back ACK at 130.

Figure 2:
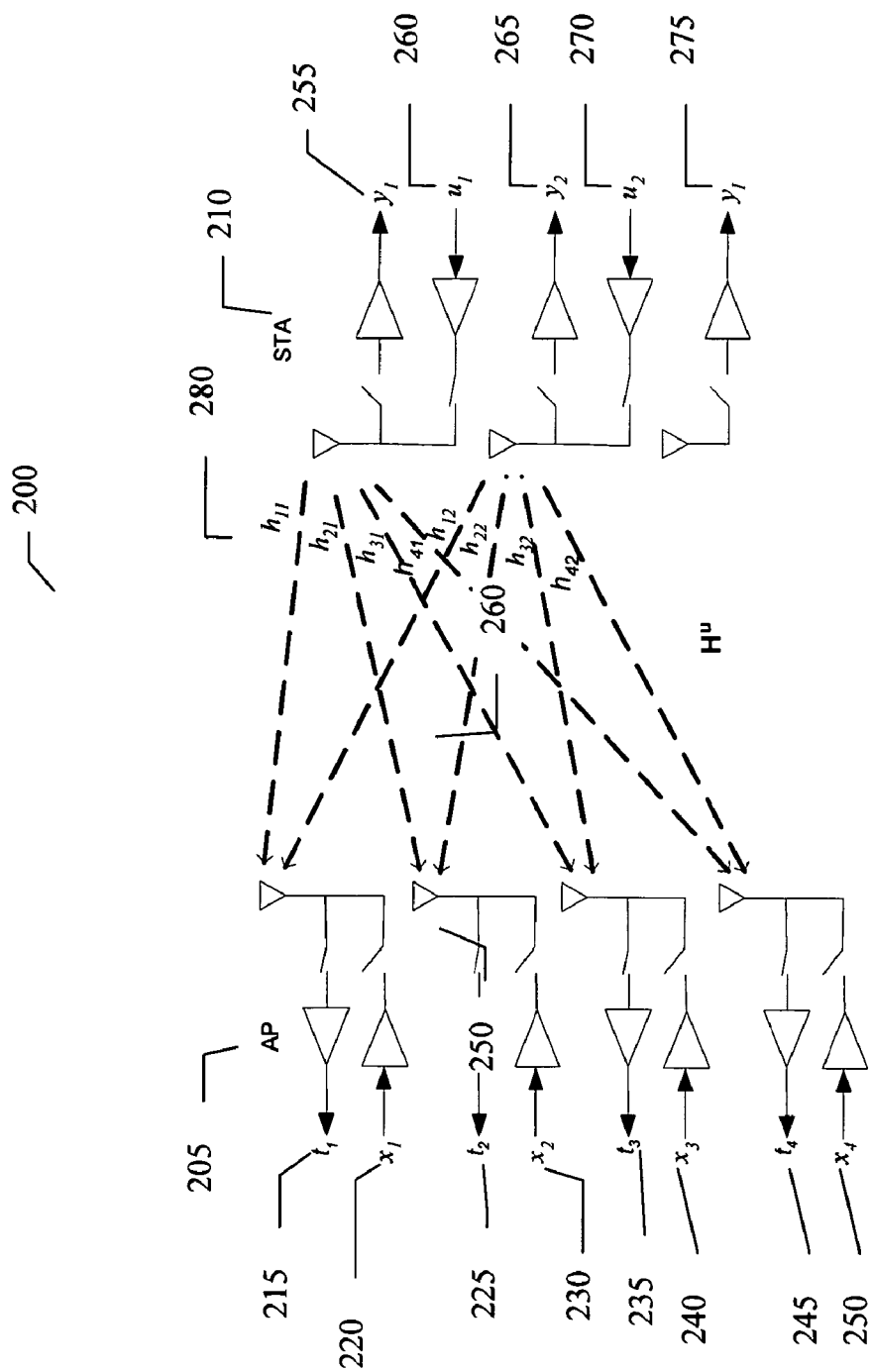
FIG. 2 depicts how the wireless station (STA) sounds the channel and the access points (AP) obtains the 4×2 uplink channel matrix in an embodiment of the present invention.

However, in the case of a 2×3 system, the reciprocity does not hold. To illustrate this, assume that an AP has 4 transmit and receive chains and a STA has 2 transmit and 3 receive chains as shown in FIG. 2, which depicts generally at 200 that the STA 210 sounds the channel 280 and the AP 205 obtains the 4×2 uplink channel matrix. 215-250 illustrate the AP side with the 4 transmit and receive chains and 255-275 illustrate the STA 2 and 3 receive chains.

Figure 3:
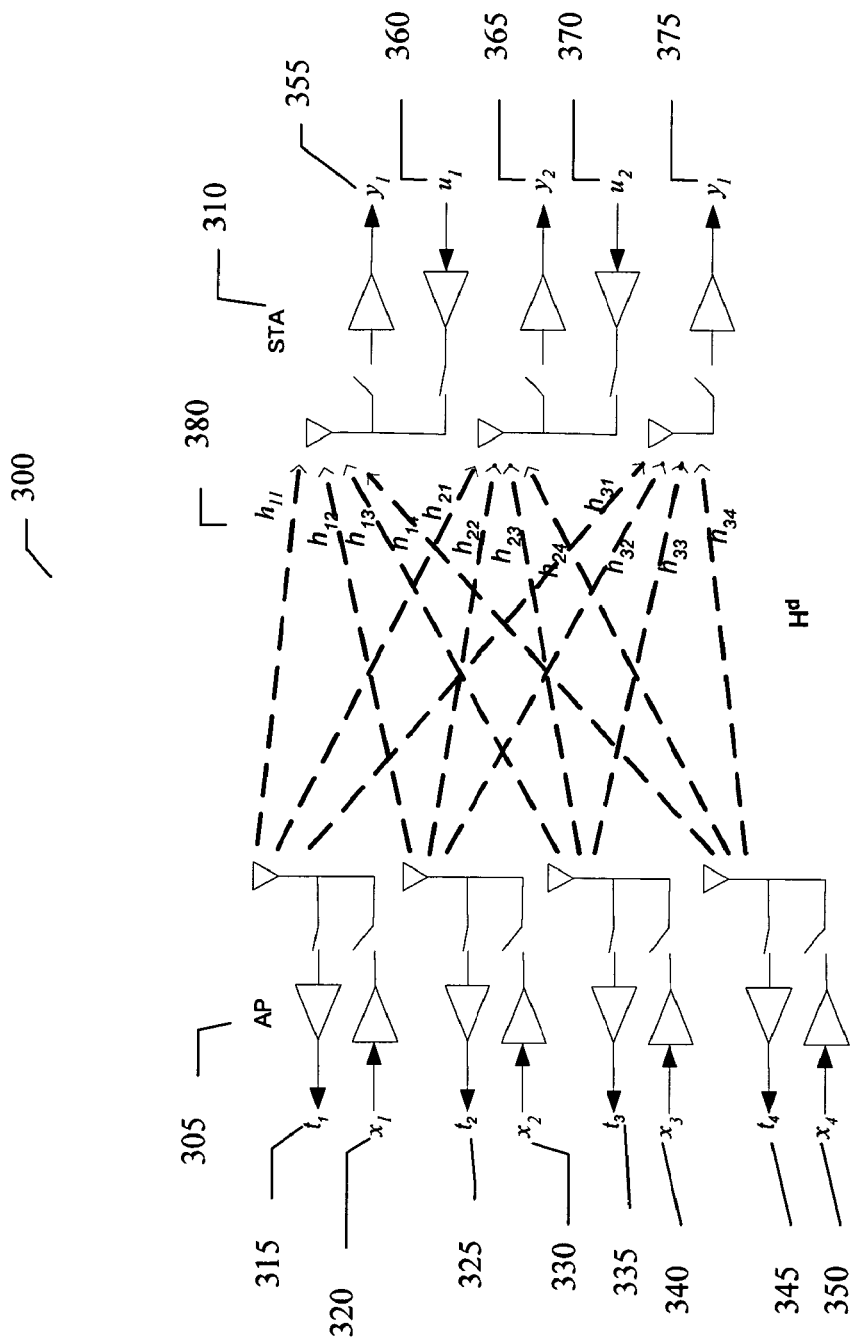
FIG. 3 depicts the channel as seen by the STA in a 3×4 channel matrix in the downlink.

As shown in FIG. 3 at 300 is the downlink. The channel 380 as seen by the STA 310 is the 3×4 channel matrix. An embodiment of the present invention provides adding an RF switch to switch a Power Amplifier to the third STA antenna 375 in order to sound the complete channel matrix for the AP 305. 315-350 illustrate the AP side with the 4 transmit and receive chains and 355-375 illustrate the STA 3 and 4 receive chains.

An embodiment of the present invention provides (automatic gain control) AGC Level Setting and Channel State Measurement. Most of the modern receivers may be able to handle an input signal power between −90 dBm to −20 dBm. The typical 8 bit (analog-to-digital converter) ADC does not have enough dynamic range to resolve the full scale. The front end AGC is essential to set the gain level such that the averaged base band signal is in the appropriate ADC range for maximum accuracy. The short preamble may thus be used for the receiver to choose the appropriate AGC setting. The long preambles may be used for channel state measurement.

Figure 4:
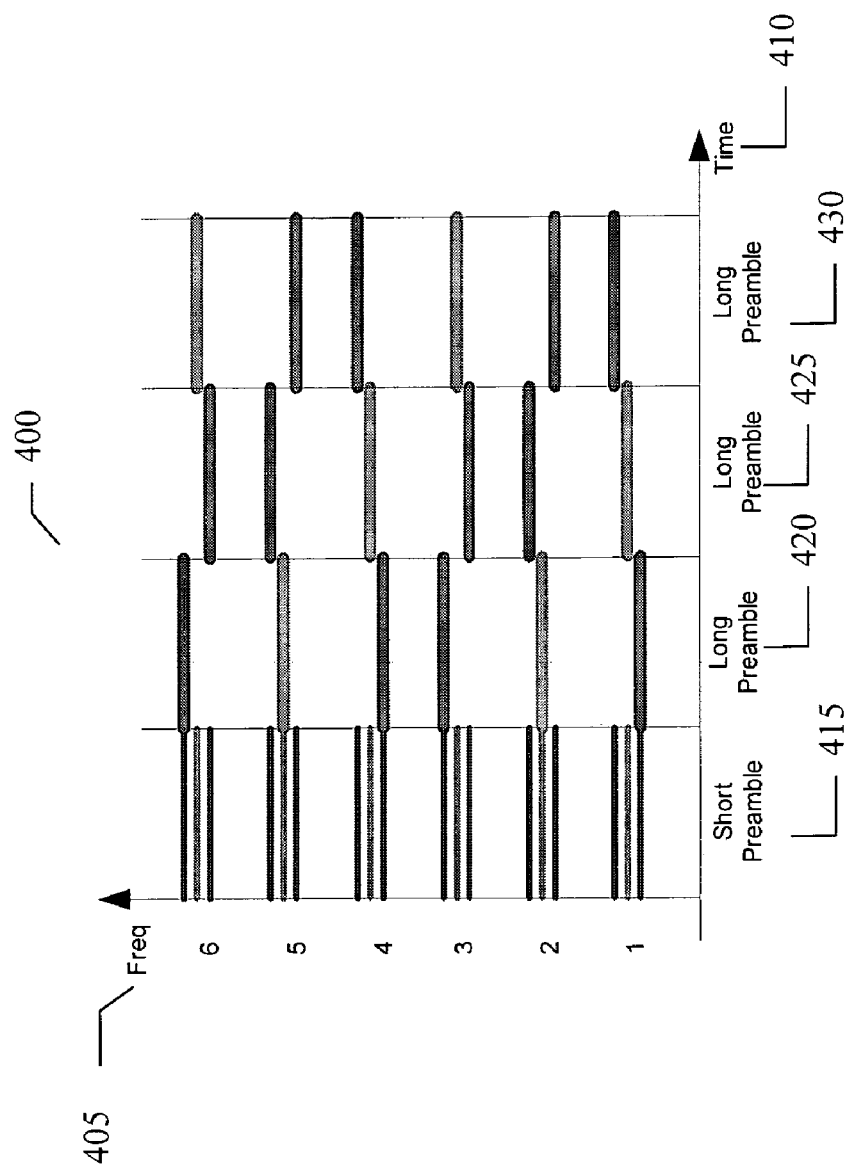
FIG. 4 depicts the short and long preamble format in the MIMO packet header wherein the system has 3 transmit and receive chains.

The following illustrates the process in the following 3×3 system. FIG. 4, generally at 400, illustrates the short 415 and long 420, 425, 430 preamble format in the MIMO packet header as frequency 405 vs. time 410. The system has 3 transmit and receive chains. The different grayscales or color denote different antennas (i.e., first, second and third antennas in one embodiment). Only 6 tones are shown in the drawing to reduce the clutter, however, in typical use, such as the 802.11a/g standard there may be 52 tones—although the present invention is not limited to specific numbers of tones.

When the STA 125 of FIG. 1 sends the CTS packet 120, the AP 105 needs to measure the uplink channel matrix accurately. The measurement is done in the short and long preamble portion of the packet shown in FIG. 4. In an exemplary embodiment and not limited in this respect, an AP may be a 4×4 system.

In the short preamble, all antennas and tones may be on so the AGC of the AP may settle to the most appropriate gain level to maximize accuracy. The next 3 long preambles train the 4×3 channel matrix for every tone. The tone interleaving at each time slot is used to make sure the average power stay close to the average. The thicker lines indicate a factor of 3 higher power in each tone in order to make the total output power the same.

If the STA is a 2×3 system, the scheme indicated in FIG. 4 will not work due to the lack of a third transmitter. In another embodiment of the present invention is provided an interleaving scheme to mitigate this problem. For a 2×3 system, the present invention may use an extra switch to connect the third antenna to a Power Amplifier (PA) so the channel reciprocity may be used in implicit feedback. Also provided is a short preamble and long preamble format to facilitate the channel state measurement by the device communicating with this system.

Figure 5:
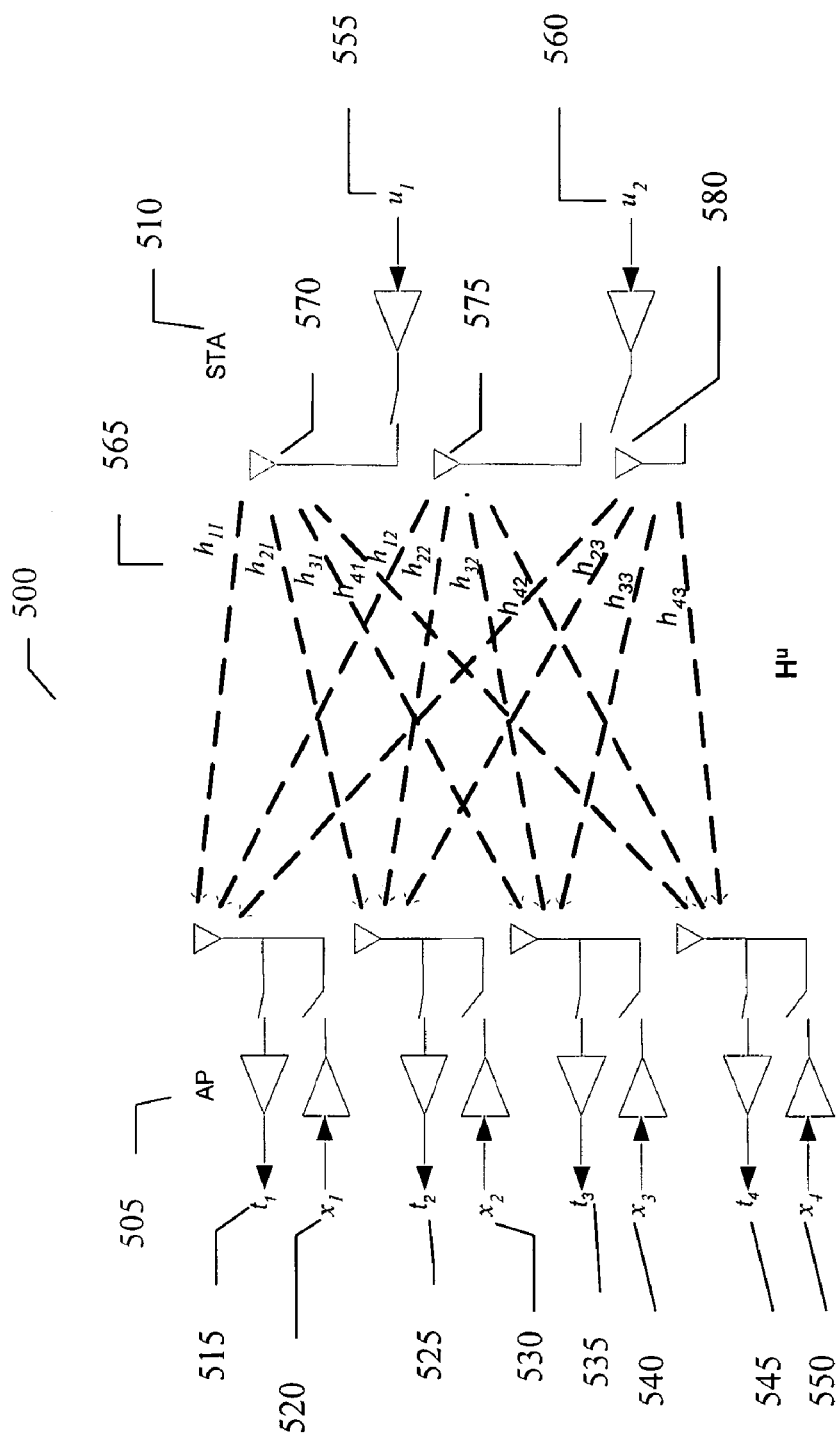
FIG. 5 illustrates a 1+1×2 switch scheme.

As shown in FIG. 5, generally at 500, is a first switch topology of one embodiment of the present invention where one PA 555 serves the first antenna 570 and another PA 560 serves the other 2 antennas 575 and 580 alternatively through a 1×2 switch (SPDT). The receive chain on the STA 510 side is omitted to simplify the picture. Illustrated at 515-550 are the transmit and receive antennas and PAs of AP 505 with channel shown at 565.

Figure 6:
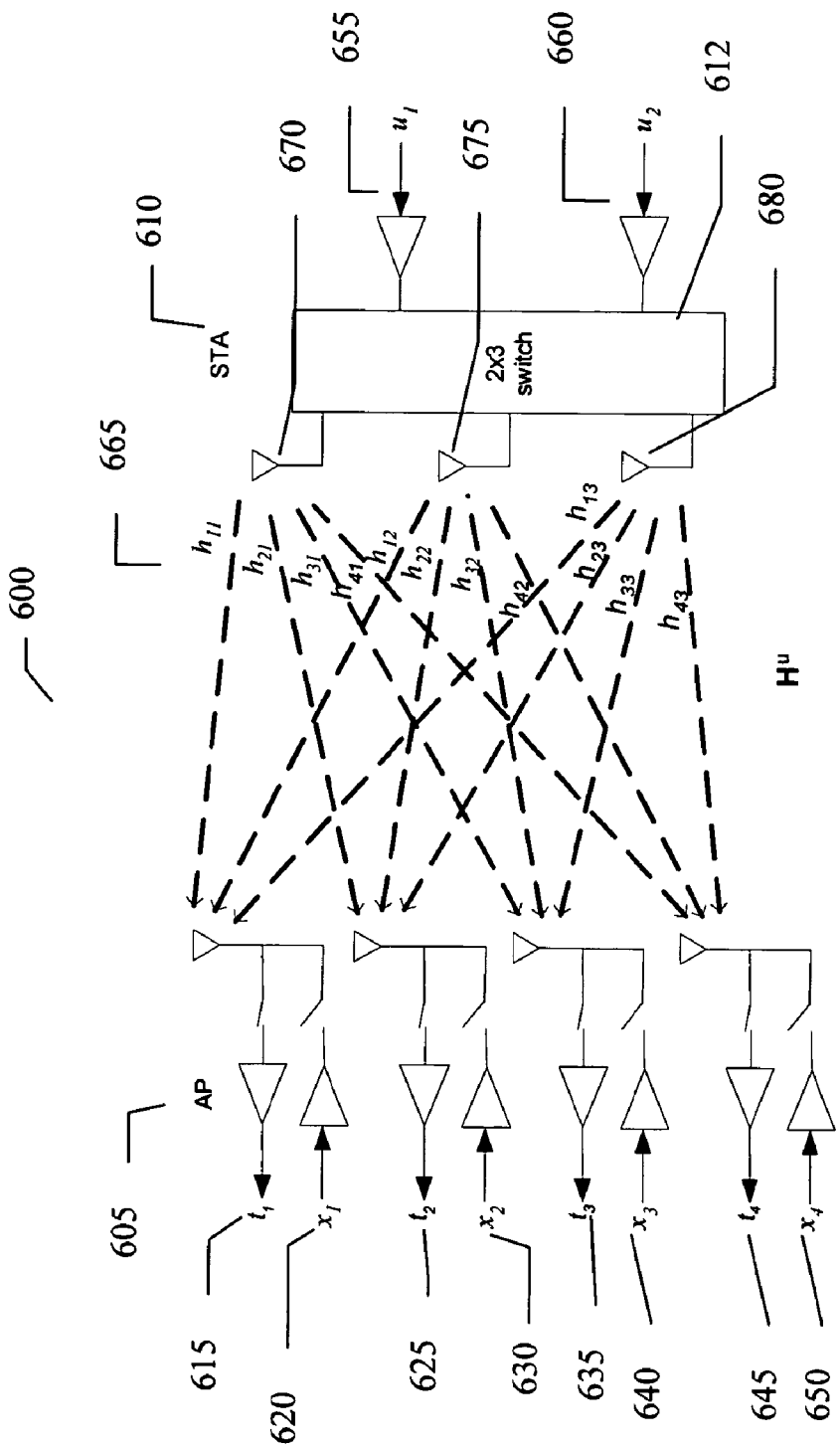
FIG. 6 illustrates a 2×3 switch scheme to connect any two of the 3 antennas to the 2 PAs.

Turning now to FIG. 6, illustrated generally at 600, is a second switch scheme which uses a 2×3 switch 612 to connect any two of the three antennas 670, 675 and 680 to the 2 PAs 655 and 660. The channel is generally illustrated at 665 and at 515-650 are the transmit and receive antennas and PAs of AP 605.

Figure 7:
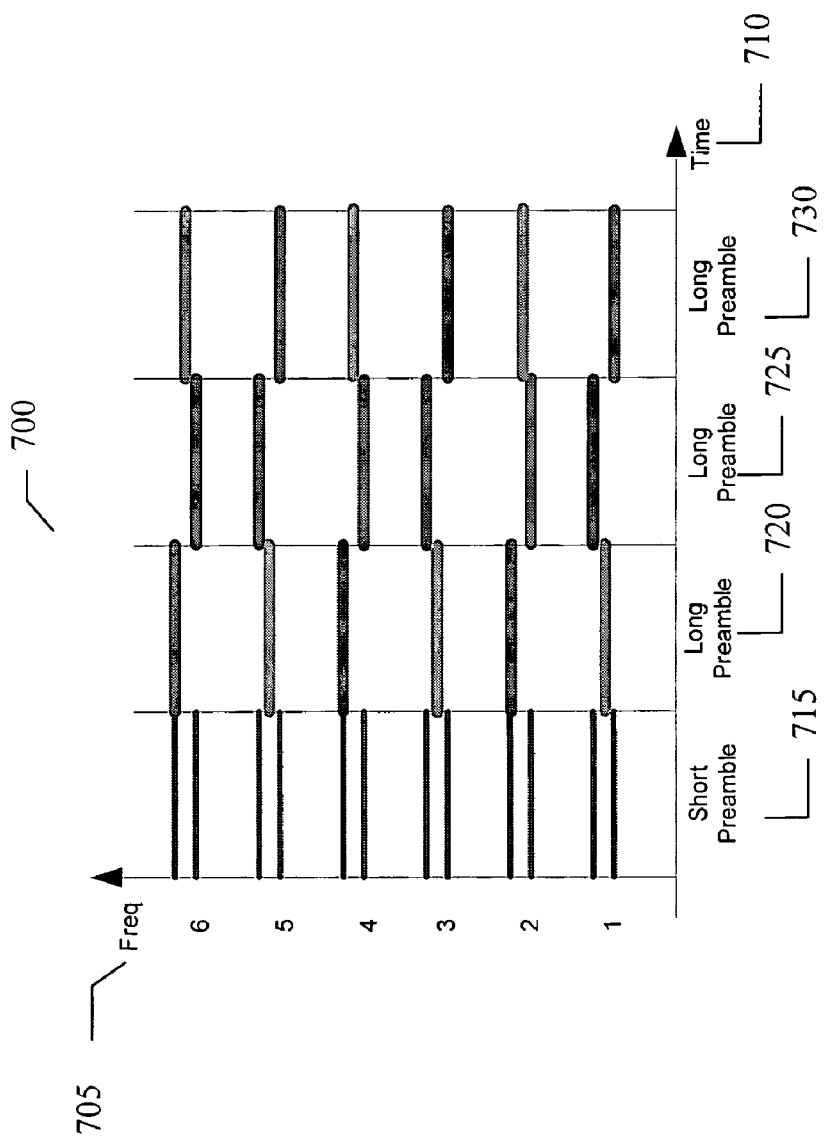
FIG. 7 depicts the preambles for the "2×3" switch of FIG. 6.

Looking now at FIG. 7, generally at 700 as frequency 705 vs. time 710, the short 715 preambles and long 720, 725 and 730 preambles are designed according to the "2×3" switch scheme. First, the system keeps track of the power received by each antenna in previous packets from the AP and then ranks them accordingly. From the reciprocity, the antenna that receives the most power also appears stronger to the AP. Therefore, the strongest and the weakest antennas are used to send the short preamble in order to set the AGC in the AP to the appropriate level.

Figure 8:
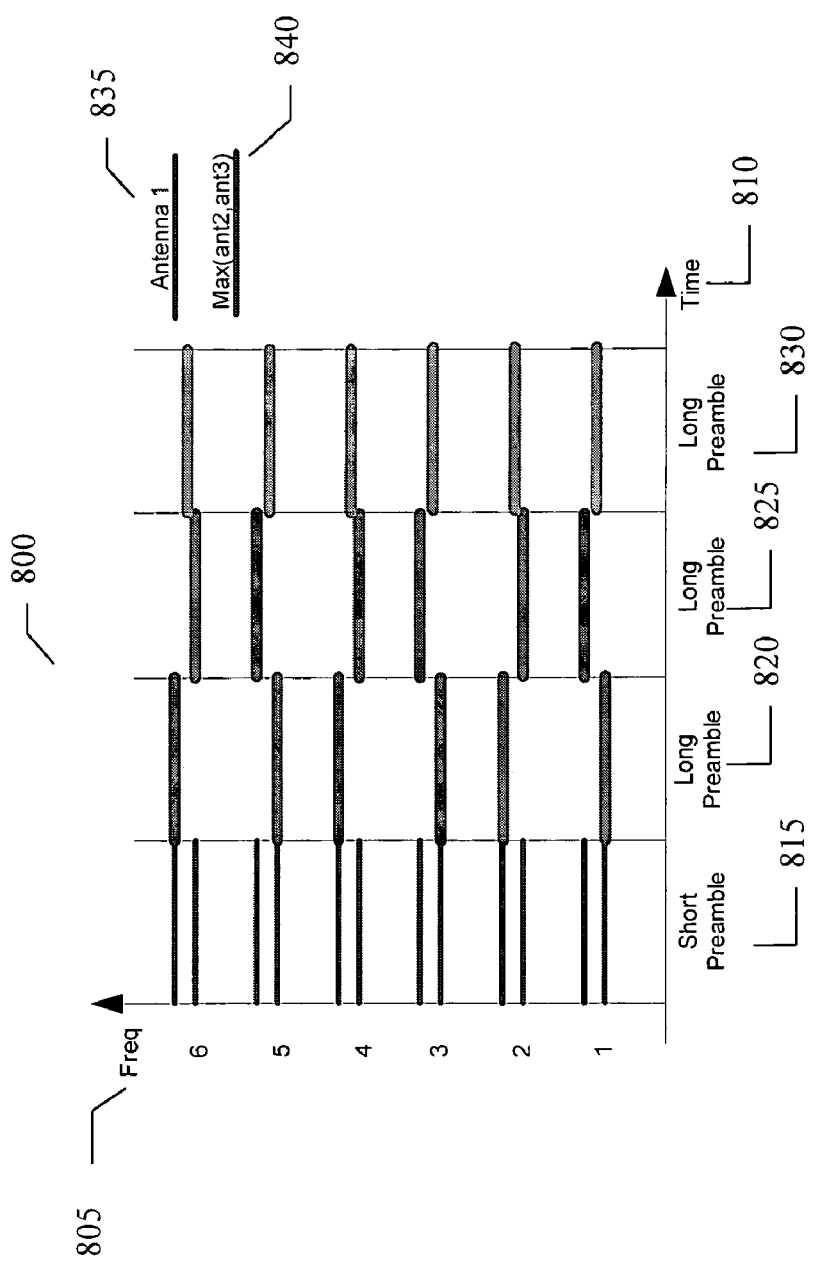
FIG. 8 depicts the preambles for the "1+1×2" switch scheme of FIG. 5.

Turning now to FIG. 8, the gray scales represent the stronger of antenna 2 and 3. Further, the pair of antennas, 1 and the stronger of 2 and 3 are selected for long preamble 820 and 825. And the other antenna is selected for long preamble 830, such that all tones and antennas are exercised once and only once. The thicker lines indicate a factor of 2 higher power in each tone so that the total emitted power are constant—although the present invention is not limited in this respect.

The switch scheme A outlined in FIG. 4 is less flexible than that of FIG. 5 as it has one PA serving antenna 1 only. The other PA serves either antenna 2 or 3. The short preamble 815 may be sent using antenna 1 and the stronger of antenna 2 and antenna 3. The long preambles 820, 825 and 830 may be sent with the tone interleaving scheme as if it is a two antenna system. The third long preamble may be sent with the PA switched to the third antenna.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus, comprising:
a plurality of power amplifiers;
a plurality of antennas, the plurality of antennas including at least one antenna to receive wireless data signals and to not transmit wireless data signals, wherein the at least one antenna is capable of being connected with a first power amplifier of the plurality of power amplifiers; and
a switch to switch a connection with the first power amplifier, said switching comprising switching between the at least one antenna and at least one other of the plurality of antennas, said switching to occur when the apparatus is sounding a complete channel matrix for a remote device, the apparatus operative to rank each of the plurality of antennas based on power received in one or more packets received from an access point and transmit a short preamble to the access point using a strongest antenna and a weakest antenna from among the plurality of antennas.

2. The apparatus of claim 1, wherein all of said plurality of power amplifiers are switchably connected to said plurality of antennas.

3. The apparatus of claim 1, wherein said plurality of antennas are three antennas and said plurality of power amplifiers are two power amplifiers; and
wherein both of said power amplifiers are switchably connected to all of three said antennas.

4. The apparatus of claim 1, wherein the complete channel matrix is a 3×4 channel matrix.

5. The apparatus of claim 1, wherein said switching occurs during one or more long preambles.

6. The apparatus of claim 1, wherein the complete channel matrix corresponds to a multiple input multiple output (MIMO) wireless communications channel.

7. The apparatus of claim 1, wherein the complete channel matrix corresponds to an uplink channel with the access point.

8. A method, comprising:
providing a plurality of antennas in a wireless station, the plurality of antennas including at least one antenna to receive wireless data signals and to not transmit wireless data signals, wherein the at least one antenna is capable of being connected with a first power amplifier of a plurality of power amplifiers;
ranking each of the plurality of antennas based on power received in one or more packets received from an access point;
switching a connection with a first of the plurality of power amplifiers, said switching comprising switching between the at least one antenna and at least one other antenna of said plurality of antennas, said switching to occur when the wireless station is sounding a complete channel matrix for a remote device; and
transmitting a short preamble to the access point using a strongest antenna and a weakest antenna from among the plurality of antennas.

9. The method of claim 8, further comprising connecting switchably all of said plurality of power amplifiers to all of said plurality of antennas.

10. The method of claim 8, wherein said plurality of antennas are three antennas and said plurality of power amplifiers are two power amplifiers; and wherein the method further comprises connecting switchably both of said two power amplifiers to all of said three antennas.

11. The method of claim 8, wherein the complete channel matrix is a 3×4 channel matrix.

12. The method of claim 8, wherein said switching occurs during one or more long preambles.

13. The method of claim 8, wherein the complete channel matrix corresponds to a multiple input multiple output (MIMO) wireless communications channel.

14. An article comprising a non-transitory storage medium having stored thereon instructions, that, when executed by a computing platform causes a wireless station comprising a plurality of antennas to:

rank each of the plurality of antennas based on power received in one or more packets received from an access point;

switch a connection with a first of a plurality of power amplifiers, said switching comprising switching between a first antenna of said plurality of antennas and a second antenna of said plurality of antennas, said switching to occur when the wireless station is sounding a complete channel matrix for a remote device; and transmit a short preamble to the access point using a strongest antenna and a weakest antenna from among the plurality of antennas;

wherein the first antenna is to receive wireless data signals and is to not transmit wireless data signals, and the at least one antenna is capable of being connected with the first power amplifier of the plurality of power amplifiers.

15. The article of claim 14, wherein the instructions, when executed by a computer platform, further cause connecting switchably all of said pluratliy of power amplifiers to all of said plurality of antennas.

16. The article of claim 14, wherein said plurality of antennas are three antennas and said plurality of power amplifiers are two power amplifiers; and wherein the instructions, when executed by a computer platform, further cause connecting switchably both of said two power amplifiers to all of said three antennas.

17. The article of claim 14, wherein the complete channel matrix is a 3×4 channel matrix.

18. The article of claim 14, wherein said switching occurs during one or more long preambles.

19. The article of claim 14, wherein the complete channel matrix corresponds to a multiple input multiple output (MIMO) wireless communications channel.

20. The article of claim 14, wherein the complete channel matrix corresponds to an uplink channel with the access point.

* * * * *

UNITED STATES PATENT AND TRADEMARK OFFICE
CERTIFICATE OF CORRECTION

PATENT NO. : 8,279,972 B2  
APPLICATION NO. : 12/940700  
DATED : October 2, 2012  
INVENTOR(S) : Qinghua Li et al.

Page 1 of 1

It is certified that error appears in the above-identified patent and that said Letters Patent is hereby corrected as shown below:

In column 8, line 10, in claim 15, delete "pluratliy" and insert -- plurality --, therefor.

Signed and Sealed this
Eleventh Day of December, 2012

David J. Kappos
*Director of the United States Patent and Trademark Office*